United States Patent Office 3,025,268
Patented Mar. 13, 1962

3,025,268
ETHYLENE INTERPOLYMERS AND PROCESS
Oliver DeS. Deex and John D. Calfee, Dayton, Ohio, assignors to Monsanto Chemical Company, St. Louis, Mo., a corporation of Delaware
No Drawing. Filed Dec. 15, 1958, Ser. No. 780,196
13 Claims. (Cl. 260—77.5)

The present invention is directed to interpolymers of ethylene, vinyl esters and β-hydroxyethyl vinyl ether, and to the process of making same. The invention is further directed to modifying the foregoing interpolymers by treatment with isocyanates, and to the resulting modified interpolymers.

It has long been known that hydroxyl-containing vinyl compounds do not readily interpolymerize with other vinyl monomers, and that even when interpolymerization occurs, often only low molecular weight interpolymers are produced. It has now been discovered, however, that β-hydroxyethyl vinyl ether, ethylene and vinyl esters, notably vinyl acetate, are capable of interpolymerizing at elevated temperature and high pressure in the presence of free-radical initiating catalyst to produce high molecular weight ethylene/vinyl ester/β-hydroxyethyl vinyl ether interpolymers.

β-Hydroxyethyl vinyl ether can also be termed "vinyloxyethanol," and the latter name will generally be employed herein for the sake of brevity.

For convenience, vinyl acetate is generally employed as the vinyl ester in the ethylene/vinyl ester/vinyloxyethanol interpolymers of the present invention. However, the vinyl ester of any saturated hydrocarbon monocarboxylic acid can be so employed, particularly those having from about 1 to 6 carbon atoms, notably the vinyl esters of 1-carboxyalkanes, for example, vinyl formate, vinyl acetate, vinyl propionate, vinyl butyrate, vinyl valerate, vinyl caproate, vinyl benzoate, etc. Such interpolymers can be prepared by substituting any of the foregoing vinyl esters for vinyl acetate in the polymerization procedures described herein.

The interpolymers thus produced can probably be best described as having the structure characteristic of high pressure polyethylene, but substituted at intervals by β-hydroxyethoxyl groups and acyloxy groups. Thus a polymer is provided having not only acyloxy substituents, but also having primary hydroxyl groups separated by ethoxy groups from the hydrocarbon backbone of the polymer.

It is an object of the present invention to provide a straight-forward procedure for producing hydroxyl-containing ethylene interpolymers. It is a further object to provide solid, non-crystalline, rubbery ethylene interpolymers containing hydroxyl groups. The presence of hydroxyl groups in such a polymer will provide reactive groups for curing, cross-linking, or for the addition of various groups to modify the properties of the polymer in various ways as may be desired.

While the present invention is particularly concerned with polymers having β-hydroxy-ethoxyl groups, it will be understood that polymers having other omega-hydroxyalkoxyl groups are within the invention and can be prepared by interpolymerization under the conditions described herein of ethylene and vinyl acetate with hydroxyalkyl vinyl ethers in which the alkyl group has 2 to 20 or so carbon atoms, particularly 2 to 4 carbon atoms, as represented by:

$$H_2C=CH—O—CH_2(CH_2)_nCH_2OH$$

in which $n$ is, for example, in the range of 0 to 4, particularly 0 to 2; while rubbery interpolymers as described more fully hereinbelow and containing hydroxyalkoxyl groups as described other than β-hydroxyethoxyl have valuable uses as described herein, including reaction with isocyanates, it is to be understood that neither polymers containing the other described hydroxyalkoxyl nor any other hydroxyalkoxyl groups are by any means considered equivalent to the β-hydroxyethoxyl containing polymers with respect to such uses and the ease of preparation in high molecular weight species. The proportions in which hydroxyalkyl vinyl ethers in general are to be employed are substantially those described below with respect to β-hydroxyethyl vinyl ethers.

The rubbery, high molecular weight interpolymers of particular interest and within the present invention are those ethylene/vinyl acetate/vinoxyethanol interpolymers in which the vinyl acetate and vinoxyethanol together never comprise much more than 60 parts by weight of a total of 100 parts by weight of interpolymer, and in which the amount of vinoxyethanol is much less than 50% by weight of the vinyl acetate, ordinarily being less than 25% by weight of the vinyl acetate. The interpolymers of especial interest are those prepared by copolymerizing about 50 to 60 parts ethylene, 40 to 50 parts vinyl acetate and 1 to 10 parts vinyloxyethanol, all parts being by weight; it is usually preferred that the amount of vinoxyethanol monomer be about 2% to about 6% by weight.

It will be noted that the hydroxyl groups in the interpolymers described above are primary hydroxyl groups, as contrasted with the secondary hydroxyl groups found in polyvinyl alcohol type polymers, and such primary hydroxyl groups are more thermally stable and less subject to loss by splitting out of water than the secondary hydroxyls; consequently, greater thermal stability is to be expected from the present interpolymers than from polyvinyl alcohol type materials. Moreover, the secondary hydroxy groups in polyvinyl alcohol will not react as readily with isocyanates as will the primary hydroxyls in the present polymers; in addition, ester and similar derivatives formed from primary hydroxyls are more stable than such derivatives formed from secondary hydroxyls.

The following examples are illustrative of the invention.

*Example 1*

A 250 cc. bomb was charged with 35 grams 2-vinyloxyethanol, 52 grams redistilled vinyl acetate and 0.003 cc. of ditertiarybutyl peroxide, and pressured to 25,000 p.s.i. with ethylene. The bomb was then heated for twelve hours at constant pressure and to an internally measured temperature of 120° C. The resulting polymer was treated with boiling benzene and 1% (by weight, based on the polymer) of p-diphenyl methylene diisocyanate, and evaporated to dryness. A portion of the polymer was then pressed between polished plates at 150° C. to form a vulcanized, elastic film.

*Example 2*

Ethylene, vinyl acetate, and 2-vinoxyethanol were interpolymerized in portions of about 53 parts of ethylene, 44 parts of vinyl acetate and 3 parts of vinyloxyethanol in a jacketed reactor under pressure of 30,000 p.s.i. at a jacket temperature of 125° C. and peak reaction temperature of about 150° C. The polymerization was conducted with about 200 weight parts per million of caprylyl peroxide, based on the polymerizable monomers, as initiator, and continued to conversion of about 20%. The polymer contained polymerizate of the monomers in approximately the proportions in which they were supplied to the reactor. The interpolymer was then cured by heating to 225° F. with 2% by weight of p-diphenylmethylene diisocyanate for about one-half hour, to give a rubber of the following properties:

| | |
|---|---|
| 500% tensile modulus (p.s.i.) | 215 |
| Tensile strength at break (p.s.i.) | 1420 |
| Elongation at break (percent) | 1060 |
| Reduced permanent set (percent) | 9.5 |

The reduced permanent set is the percentage of extension remaining unrecovered ten minutes after rupture. Use of slightly larger amounts of diisocyanate curing agent with the above interpolymer increases the modulus while the tensile strength, elongation and permanent set are decreased. By multiplying the tensile strength above by the elongation, a tensile product of $15.05 \times 10^5$ is obtained, which is a fairly high value and indication of good tensile strength and elongation properties.

*Example 3*

An interpolymer was prepared by polymerizing ethylene, 50 parts, vinyl acetate, 44 parts, and vinyloxyethanol, 6 parts, in a tubular reactor under 30,000 p.s.i. and at a peak temperature of about 140° C.; caprylyl peroxide, 214 weight parts per million based on the monomers, was used as initiator, and the dwell time was about 1.8 minutes on the average. The solid, colorless interpolymer was compounded in proportions of 50 parts of carbon black ("Philblack O") and 5 parts p-diphenyl methylene diisocyanate to 100 parts of interpolymer and cured at 255° F. for 20 minutes to give a reinforced rubber of the following properties:

Tensile strength (p.s.i.) _____ 2950
Elongation (percent) _____ 225
Reduced permanent set (percent) _____ 5.3

When the same compound material was permitted to cure by standing at room temperature (75° F.) for 4 days, a substantially equivalent cure was obtained as shown by the following data:

Tensile strength (p.s.i.) _____ 2650
Elongation (percent) _____ 260
Reduced permanent set (percent) _____ 4.6

Thus, the present invention makes it possible to obtain a cured rubber having good tensile strength, even when the curing operation is conducted at room temperature.

*Example 4*

Ethylene, 53 parts, vinyl acetate, 45 parts, and vinyloxyethanol, 2 parts, were interpolymerized in a reactor at 30,000 p.s.i. and a peak reaction temperature of slightly over 200° C. The interpolymer was cured at 255° F. with 7.5% p-diphenyl methylene diisocyanate for 30 minutes to give a material having 500% tensile modulus of 725 p.s.i., tensile strength of 970 p.s.i., elongation of 550% and reduced permanent set of 7.3%.

*Example 5*

An ethylene/vinyl acetate/vinyloxyethanol interpolymer prepared by peroxide catalyzed polymerization as described herein from 58 parts ethylene, 40 parts vinyl acetate, and 2 parts vinyloxyethanol, all parts being by weight, was cured by heating at 140° C. with 6% p-diphenyl methylene diisocyanate to give a cured rubber having 300% modulus of 500 p.s.i., tensile strength of 2050 p.s.i., elongation at break of 490% and reduced permanent set of 6.9%.

The process of the present invention can be carried out under conditions which cause the polymerization of ethylenically unsaturated monomers to high molecular weight solid materials, particularly under the conditions which are employed in the high pressure polymerization of ethylene. The interpolymerization of the present invention can be carried out at pressures from about 5000 p.s.i. gauge to 50,000 p.s.i. gauge at temperatures of about 50° C. to 250° C., but is preferably carried out at pressures from about 15,000 p.s.i. to 50,000 p.s.i. and at temperatures from about 100° C. to 200° C. It is, of course, possible to employ higher pressures up to 200,000 p.s.i or even up to 1,000,000 p.s.i. or more, but such extremely high pressures are not required. The use of lower pressures, down to 500 p.s.i. or so or even down to atmospheric pressure will cause the production of polymers of lower molecular weight and having other variations from the preferred product, but the use of such conditions in the polymerization under consideration is part of the invention in so far as it is novel and results in useful products. Similarly, it is possible to employ higher temperatures than those described above, so long as they do not cause pyrolysis, and it is also possible to employ lower temperatures, even down to room temperature or the like, although the reaction will not be very rapid at low temperatures. Moreover, when catalysts which dissociate in the polymerization reaction are employed, it is preferred to employ temperatures high enough to cause such dissociation.

It is known that ethylene will polymerize at elevated temperature and pressure in the absence of catalysts, particularly if the ethylene happens to contain trace small amounts of oxygen which have a catalytic effect. However, in the present invention, it is preferred to employ free radical initiating catalysts to insure the preparation of high molecular weight materials in reasonable reaction times. In general, ethylene polymerization catalysts, including oxygen are suitable. On a weight basis, about 10 to 200 parts per million of oxygen is very suitable at 20,000 to 40,000 p.s.i. ethylene. Among the preferred catalysts are the peroxide catalysts and the azo catalysts. Among the peroxide type catalysts are for example ditolyl peroxide, benzoyl peroxide, diacetone peroxide, succinyl peroxide, acetyl peroxide, acetylbenzoyl peroxide, metabromobenzoyl peroxide, lauroyl peroxide, 2,2-bis-t-butylperoxybutane hydrogen peroxide, zinc peroxide, peracetic acid, alkali metal persulfates, perborates and percarbonates, ammonium persulfate, perborate and percarbonate and in general all those peroxide compounds which are either formed by the action of hydrogen peroxide on ordinary acids or else which give rise to hydrogen peroxide on treatment with dilute sulfuric acid. These materials are peroxy compounds as defined in Webster's International Dictionary (1935) 2nd edition [page 3 of Patent 2,396,920 and column 3 of Patent 2,748,170]. As examples of suitable azo catalysts may be mentioned bis-benzene diazosuccinate, the inorganic acid salts of 2,2'-diguanyl-2,2'-azopropane, 2,2'-azobis(methylisobutyrate) or 2,2'-azobis(isobutyramide). The catalysts will ordinarily be employed in as small quantity as will produce the desired polymer in a reasonable reaction time. Moreover, the amount of catalyst has some effect on molecular weight as larger amounts of catalysts ordinarily cause the production of lower molecular weight materials. However, the amounts of catalysts employed will ordinarily be within the range of 0.0005 percent to 2 percent, based on the monomers. The interpolymers produced in the present invention are solid materials preferably having molecular weights of at least 10,000 and ordinarily having molecular weights ranging from 20,000 to 50,000 or 100,000, and can even have molecular weights as high as 1,000,000 or more. The molecular weights referred to are those calculated in the conventional manner on the basis of the viscosity of the polymer in solution as described in the Journal fur Praktischemie, 2nd series, volume 158, page 136 (1941) and Journal of the American Chemical Society, 73, page 1901 (1951).

The interpolymerization reaction of the present invention can be conducted as a batch reaction, a series of batch reactions, or as a continuous reaction as in a tubular reactor. The reaction can be conducted according to the conditions described in the copending application of John D. Calfee, S.N. 755,425, filed on August 5, 1958.

While it might be conceivable to prepare polymers resembling the type obtained in the present polymerization by copolymerizing ethylene and vinyl acetate, conducting a controlled hydrolysis of the acetate groups, and then esterifying the resulting free hydroxyls with an hydroxy alkyl group, it can readily be appreciated that such a procedure would be inferior, not only because of the number of steps required, but also because of the requirements for controlling the extent of the hydrolysis and etherification reactions. By contrast, the present process provides a method of preparing ethylene/vinyl acetate/vinyloxyethanol interpolymers in which the proportions are readily subject to control over wide ranges in the amounts and ratios of acetoxy and hydroxyethoxyl groups.

As the organic isocyanate cross-linking agents employed in the present invention, any organic polyisocyanates capable of reacting with groups containing active hydrogen to form addition products can be employed. Generally, the cross-linking agents will be hydrocarbon diisocyanates, such as those represented by the formula

where R represents a divalent aliphatic or alicyclic hydrocarbon group of 2 to 18 carbon atoms, or divalent hydrocarbon residues of benzene, naphthalene, diphenyl, diphenyl alkanes, or triphenyl alkanes. Typical of the polyisocyanates which can be employed are trimethylene diisocyanate, tetramethylene diisocyanate, pentamethylene diisocyanates, hexamethylene diisocyanate, decamethylene diisocyanate, 2-decyl-1,3-diisocyanatopropane, p-phenylenediisocyanate, 4,4'-methylene diphenyl isocyanate, toluene, 2,4-diisocyanate, 2,4-diisocyanato-1-chlorobenzene, 1,2,4-benzene triisocyanate, 1,4-cyclohexylene diisocyanate. It will be realized that homologues of the foregoing can be employed, and it will also be possible to employ analogs, such as the corresponding thioisocyanates. The part of the molecule intermediate to the isocyanate groups can contain other groups such as halogen, ether, thioether, tertiary amino, sulfone, etc., groups which do not contain active hydrogen atoms. The organic polyisocyanates can be employed in the form of their precursors, e.g., phenyl urethanes, or generated in situ in the curing reaction, as by eliminating hydrogen chloride from the corresponding carbamic chloride compounds. The reaction with organic isocyanates will generally produce urethane groups, and the resulting products can be considered polyurethanes.

The amount of organic isocyanate employed in the curing reaction can be varied to some extent, dependent upon the amount of cross-linking desired, but amounts in the range of about 1 to 5% or 10% by weight based on the ethylene/vinyl acetate/vinyloxyethanol interpolymer are usually suitable. Larger amounts such as up to 40 or 50% by weight can be employed. It will often be desirable to use approximately the amount of organic polyisocyanate stoichiometrically required to react with all of the free hydroxyl groups in the interpolymer, although greater or lesser amounts can be employed; as the interpolymer may contain water or other impurities, it may actually be necessary to use greater than stoichiometric amounts of organic polyisocyanate to cause reaction with all free hydroxyl groups; if very much greater amounts are used, the resulting product will have free isocyanate groups which can be further reacted with various groups, such as carboxyl, amino, hydroxyl, etc., groups of various other monomeric or polymeric materials. Small amounts of water or water containing material can be added along with the isocyanates to cause the production of foamed products by reaction with the isocyanate groups to generate carbon dioxide—particularly when the isocyanate groups are in stoichiometric excess with respect to the hydroxyl groups of the interpolymer. In place of water, carboxyl containing materials or other materials containing groups which will react with isocyanates to generate carbon dioxide can be employed to cause foaming.

The interpolymers of the present invention can be cured not only by isocyanates, but also by peroxides, or by other organic compounds capable of generating free radicals when heated below 200° C., such as the curing agents generally employed in the curing of ethylene/vinyl acetate copolymers, e.g., dicumyl peroxide, benzoyl peroxide, ditertiary butyl peroxide, etc. However, the peroxides are not suitable for curing at room temperature, as are the organic polyisocyanates as disclosed herein; in addition, the organic polyisocyanates, particularly the solid organic polyisocyanates, are superior to such liquid agents as dicumyl peroxide with respect to handling ease, toxicity, flammability, etc.

The ethylene/vinyl acetate/vinoxyethanol interpolymers of the present invention can also be cured or cross-linked with other curing agents, cross-linking agents, reactive compounds or materials, and the like. For example, amino aldehyde or phenol aldehyde resins, particularly urea-formaldehyde, melamine-formaldehyde, or phenol-formaldehyde resins, can be employed either by treatment of the said interpolymers, preferably with heating, with the pre-prepared resins, or by treatment of the interpolymers with urea and formaldehyde or phenol and formaldehyde added as such; it is preferred to employ phenoplasts or aminoplasts—particularly phenol-formaldehyde or melamine-formaldehyde resins in partially cured state and containing free methylol or methylol ether groups for further reaction. The interpolymers of the present invention can similarly be cured with epoxides such as various epoxides designated as polyglycidyl ether resins, for example, the polyglycidyl ethers of bis-phenols, glycols, and the like. Various other cross-linking agents known to the art for the curing of free-hydroxyl containing alkyd resins and the like can likewise be employed. The foregoing cross-linking agents can also suitably be employed with the hydroxyl-containing resins described in the above-mentioned copending application S.N. 755,425.

The interpolymers of the present invention can be incorporated in polyurethane coating, molding, or foaming compositions known to the art, i.e., combined not only with organic polyisocyanates but along with the polyisocyanates in the same compositions with the other common polyurethane forming reactants such as polyesters, alkyd resins, polyethers—for example, dihydric polyethers designated as polyglycols such as polyethylene glycols, polypropylene glycols—and the like.

While the interpolymers herein are described as though composed of ethylene/vinyl acetate/vinyloxyethanol terpolymer, it may well be that they are actually polyblends comprising the said terpolymer along with ethylene/vinyl acetate copolymer, ethylene/vinyloxyethanol copolymer and vinyl acetate/vinyloxyethanol copolymer, and the term interpolymer as used herein is to be considered as including such polyblends.

The ethylene interpolymers produced according to the present invention can be employed in various molding uses, and as coatings, self-supporting films, and the like, and will have cetrain valuable properties due to the presence of the acetate and hydroxyethoxyl groups, the latter group contributing to the properties per se, or providing a site useful for reaction with cross-linking and other agents. The rubbery interpolymers described herein, particularly in their isocyanate cured condition, will be useful in various rubber applications such as hoses, tubing, gaskets, resilient padding, and in other rubber compositions in which age resistance and other special properties of the interpolymers will be advantageous. The ethylene/vinyl acetate/vinyloxyethanol interpolymers described herein can be compounded with various fillers, plasticizers and the like, as will be understood by those skilled in the art.

While in the curing actions described herein organic polyisocyanates are of particular interest, it will be realized that the properties of the ethylene/vinyl acetate/ vinyloxyethanol interpolymers described herein can also be modified by reaction with organic monoisocyanates, e.g., hexyl isocyanate, phenyl isocyanate, 2,4-tolyl isocyanate, etc.

We claim:
1. The method of preparing hydroxyl-containing inter- polymers which comprises mixing ethylene, an omega-hydroxyalkyl vinyl ether in which the omega-hydroxyalkyl group has 2 to 4 carbon atoms and a vinyl ester of an organic hydrocarbon mono-carboxylic acid of 1 to 6 carbon atoms and interpolymerizing at elevated temperatures and high pressures.

2. The method of preparing a hydroxyl-containing interpolymer which comprises interpolymerizing ethylene, β-hydroxyethyl vinyl ether and vinyl acetate at elevated temperatures and high pressures in the presence of a catalyst selected from the group consisting of oxygen, peroxide catalysts and azo catalysts.

3. The method of preparing a rubbery, hydroxyl-containing interpolymer which comprises interpolymerizing 50 to 60 parts ethylene, 40 to 50 parts vinyl acetate and 1 to 10 parts β-hydroxyethyl vinyl ether, all parts being by weight, at temperatures of about 100° C. to about 200° C. and pressures above about 15,000 p.s.i. to obtain a high molecular weight solid.

4. The method of claim 1 in which the product interpolymer is then reacted with an organic diisocyanate.

5. The method of claim 3 in which the interpolymer is then treated with a small amount of an organic diisocyanate to obtain a cured rubber.

6. The method of claim 5 in which the diisocyanate treatment is conducted at room temperature.

7. A solid rubbery interpolymer of ethylene, vinyl ester and omega-hydroxyalkyl vinyl ether in which the said vinyl ester and said vinyl ether together constitute up to 60 parts by weight of a total of 100 parts by weight of monomers and the said vinyl ether constitutes at least 1 part per 100 parts by weight of monomers and up to 25% by weight of the vinyl acetate, and in which the said vinyl ether has 2 to 4 carbon atoms in its omega-hydroxyalkyl group and in which the vinyl ester is an ester of an organic hydrocarbon mono-carboxylic acid of 1 to 6 carbon atoms, the said copolymer having a molecular weight of at least 10,000 and characterized by omega-hydroxyalkoxyl groups having the same number of carbon atoms as the said omega-hydroxyalkyl group.

8. A solid, rubbery interpolymer of 50 to 60 parts ethylene, 40 to 50 parts vinyl acetate and 1 to 10 parts β-hydroxyethyl vinyl ether, all parts being by weight, the said copolymer having a molecular weight of at least 10,000.

9. The interpolymer of claim 8 which has been cured with a small amount of an organic diisocyanate.

10. The method of obtaining a cured rubber by a curing operation at room temperature which comprises treating a hydroxyl-containing interpolymer of 50 to 60 parts ethylene, 40 to 50 parts vinyl acetate, and 1 to 10 parts β-hydroxyethyl vinyl ether, all parts being by weight, with 1 to 5% by weight of an organic diisocyanate.

11. The method of claim 10 in which the organic diisocyanate is p-diphenyl methylene diisocyanate.

12. The interpolymer of claim 7 reacted with an organic diisocyanate cross-linking agent.

13. The method of claim 3 in which the interpolymerization is a continuous mass polymerization in a tubular reactor catalyzed by catalyst selected from the group consisting of oxygen, peroxide catalysts and azo catalysts.

References Cited in the file of this patent
UNITED STATES PATENTS

| | | |
|---|---|---|
| 2,434,179 | Sharkey | Jan. 6, 1948 |
| 2,828,220 | McWherter et al. | Mar. 25, 1958 |